United States Patent
Lee

(10) Patent No.: US 9,472,977 B2
(45) Date of Patent: Oct. 18, 2016

(54) BATTERY CELL STATE OF CHARGE ESTIMATION

(71) Applicant: Ford Global Technologies, LLC, Dearborn, MI (US)

(72) Inventor: Tae-Kyung Lee, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 9 days.

(21) Appl. No.: 14/272,871

(22) Filed: May 8, 2014

(65) Prior Publication Data

US 2015/0321576 A1    Nov. 12, 2015

(51) Int. Cl.
| | |
|---|---|
| H02J 7/04 | (2006.01) |
| B60L 11/18 | (2006.01) |
| H02J 7/00 | (2006.01) |
| H02J 7/14 | (2006.01) |
| H01G 9/00 | (2006.01) |

(52) U.S. Cl.
CPC ............ *H02J 7/044* (2013.01); *B60L 11/1861* (2013.01); *H01G 9/00* (2013.01); *H02J 7/00* (2013.01); *H02J 7/0016* (2013.01); *H02J 7/0018* (2013.01); *H02J 7/0019* (2013.01); *H02J 7/0021* (2013.01); *H02J 7/0026* (2013.01); *H02J 7/14* (2013.01)

(58) Field of Classification Search
CPC ........ H02J 7/00; H02J 7/0021; H02J 7/0018; H02J 7/0016; H02J 7/14; H01G 9/00; G01N 27/416; H01M 10/44; H01M 10/441; B60L 11/18; B60L 11/1857; G01R 31/3648
See application file for complete search history.

(56) References Cited

U.S. PATENT DOCUMENTS

| | | | |
|---|---|---|---|
| 4,396,880 A * | 8/1983 | Windebank ........... | H01M 10/44 320/156 |
| 7,679,329 B2 | 3/2010 | Lim et al. | |
| 7,755,331 B2 | 7/2010 | Kawahara et al. | |
| 2002/0167291 A1* | 11/2002 | Imai ..................... | H02J 7/0018 320/119 |
| 2012/0081075 A1 | 4/2012 | Skelton | |
| 2012/0119709 A1* | 5/2012 | Mull ..................... | H02J 7/0016 320/149 |
| 2013/0147438 A1 | 6/2013 | Liu et al. | |

* cited by examiner

*Primary Examiner* — Behrang Badii

(74) *Attorney, Agent, or Firm* — David Kelley; Brooks Kushman P.C.

(57) ABSTRACT

Hybrid and electric vehicles include a traction battery including many interconnected cells. Effective battery control, such as cell balancing, may rely on an accurate state of charge value for each of the cells. A method to reduce the computational effort of the state of charge calculation is developed. An accurate pack level state of charge calculation is implemented and represents the average cell state of charge. An average cell voltage is based on a pack voltage measurement. A state of charge difference is calculated for each cell based on a difference between a cell voltage and the average cell voltage. The state of charge difference utilizes the pack state of charge and a characteristic voltage and state of charge relationship for the cell. The cell state of charge is the sum of the pack state of charge and the state of charge difference.

18 Claims, 5 Drawing Sheets

BATTERY CELL STATE OF CHARGE ESTIMATION

TECHNICAL FIELD

This application is generally related to estimating battery state of charge of a traction battery.

BACKGROUND

Hybrid-electric and pure electric vehicles rely on a traction battery to provide power for propulsion. The traction battery typically includes a number of battery cells connected in various configurations. To ensure optimal operation of the vehicle, various properties of the traction battery may be monitored. One useful property is the battery state of charge (SOC) which indicates the amount of charge stored in the battery. The state of charge may be calculated for the traction battery as a whole and for each of the cells. The state of charge of the traction battery provides a useful indication of the charge remaining. The state of charge for each individual cell provides information that is useful for balancing the state of charge between the cells. Balancing of the cells is useful as differences in the state of charge between cells may cause some cells to be overcharged or undercharged relative to the other cells.

SUMMARY

A vehicle includes a traction battery including a plurality of cells and at least one controller. The at least one controller is programmed to, in response to a difference between a cell voltage and an average cell voltage, output a cell state of charge based on a voltage offset derived from the difference and relative to a reference voltage associated with a traction battery state of charge. The at least one controller is programmed to balance the cells according to the cell state of charge of the cells. The at least one controller may be further programmed to, in response to no difference between the cell voltage and the average cell voltage, output the cell state of charge based on the reference voltage associated with the traction battery state of charge. The average cell voltage may be a quotient of an overall voltage of the traction battery and a total number of cells of the traction battery. The voltage offset may be further derived from a battery current. The cell state of charge may be further based on a cell open-circuit voltage difference derived from a cell model, wherein the difference and a battery current are inputs to the cell model. The cell state of charge may be further based on an open-circuit voltage and state of charge characteristic such that the cell state of charge is the traction battery state of charge offset by a state of charge difference associated with the cell open-circuit voltage difference.

A battery management system includes at least one controller programmed to operate a traction battery including a plurality of cells according to a cell state of charge of the cells that is based on a voltage difference between an open-circuit cell voltage and an average open-circuit cell voltage and relative to a cell voltage associated with a traction battery state of charge. The average open-circuit cell voltage may be based on an overall voltage of the traction battery and a total number of cells of the traction battery. The open-circuit cell voltage may be based on a measured cell terminal voltage. The voltage difference may be based on a battery current. Operating the traction battery may include balancing the cells based on the cell state of charge of the cells. The voltage difference may be based on a cell model output having a difference between a measured cell terminal voltage and an average cell terminal voltage as input. The voltage difference may be a difference between a first cell model output having a measured cell voltage as input and a second cell model output having an average cell terminal voltage as input.

A battery control method includes operating, by a controller, a traction battery including a plurality of cells according to a cell state of charge of the cells based on a voltage offset derived from a difference between a measured cell voltage and an average cell voltage and relative to a cell reference voltage associated with a state of charge of the traction battery. The voltage offset may be further derived from a battery current. The method may further comprise balancing the cells of the traction battery according to the cell state of charge of the cells. The average cell voltage may be based on an overall voltage of the traction battery. The cell state of charge may be further based on an open-circuit voltage and state of charge characteristic such that the cell state of charge is an average state of charge of the traction battery offset by an amount of state of charge associated with an open-circuit cell voltage difference.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
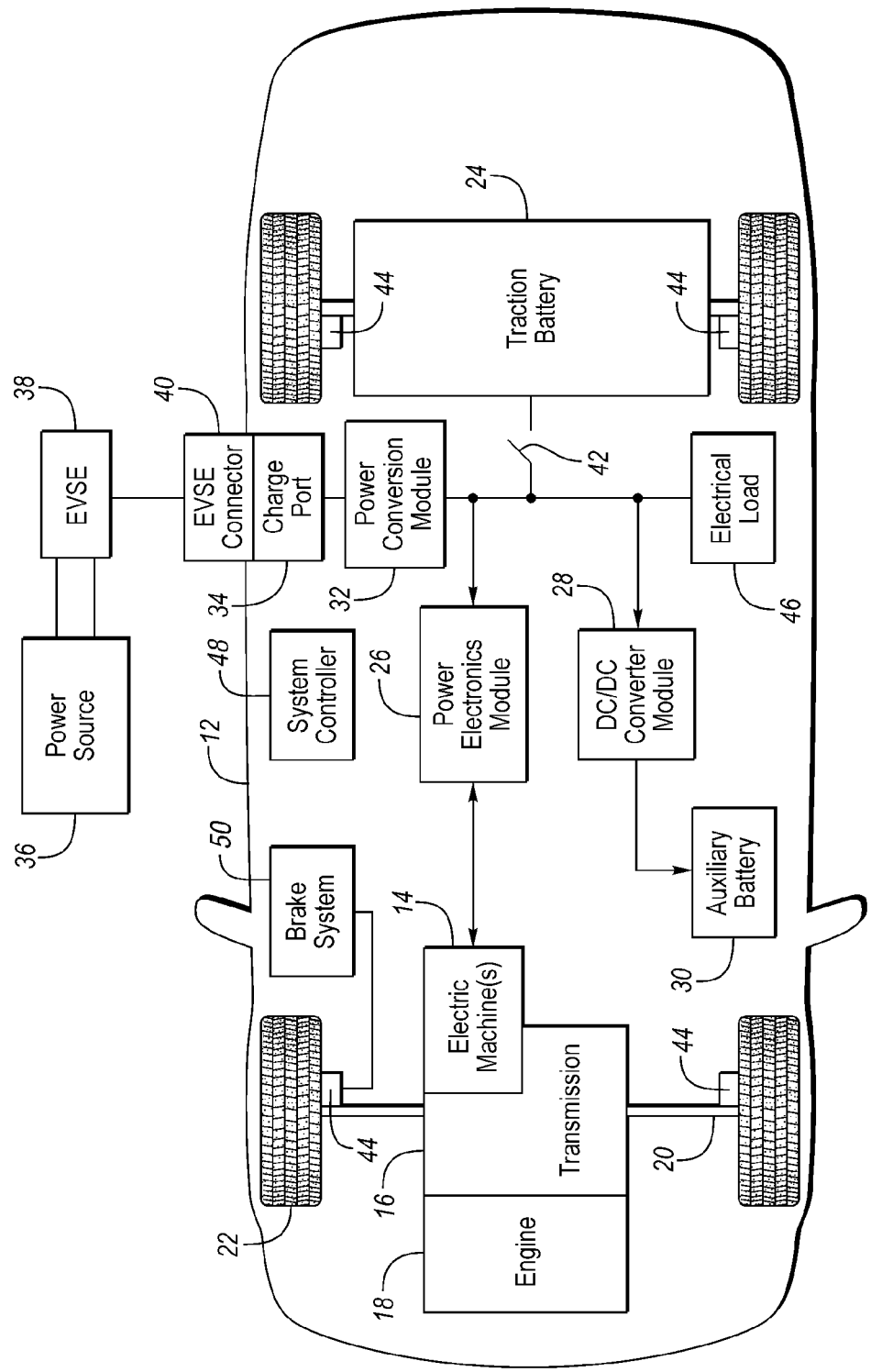
FIG. 1 is a diagram of a hybrid vehicle illustrating typical drivetrain and energy storage components.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient conditions (engine speeds and loads) and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may use a three-phase AC current to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle may include a DC/DC converter module 28 that converts the high voltage DC output of the traction battery 24 to a low voltage DC supply that is compatible with other vehicle loads. Other high-voltage electrical loads 46, such as compressors and electric heaters, may be connected directly to the high-voltage without the use of a DC/DC converter module 28. The electrical loads 46 may have an associated controller that operates the electrical load 46 when appropriate. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components that work cooperatively to operate the wheel brakes 44. For simplicity, the figure depicts one connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 to decelerate or control the vehicle. The brake system 50 may respond to driver commands and may also operate autonomously to implement features such as stability control. The controller of the brake system 50 may implement a method of applying a requested brake force when requested by another controller or sub-function.

The various components discussed may have one or more associated controllers to control and monitor the operation of the components. The controllers may communicate via a serial bus (e.g., Controller Area Network (CAN)) or via discrete conductors. In addition, a system controller 48 may be present to coordinate the operation of the various components.

Figure 2:
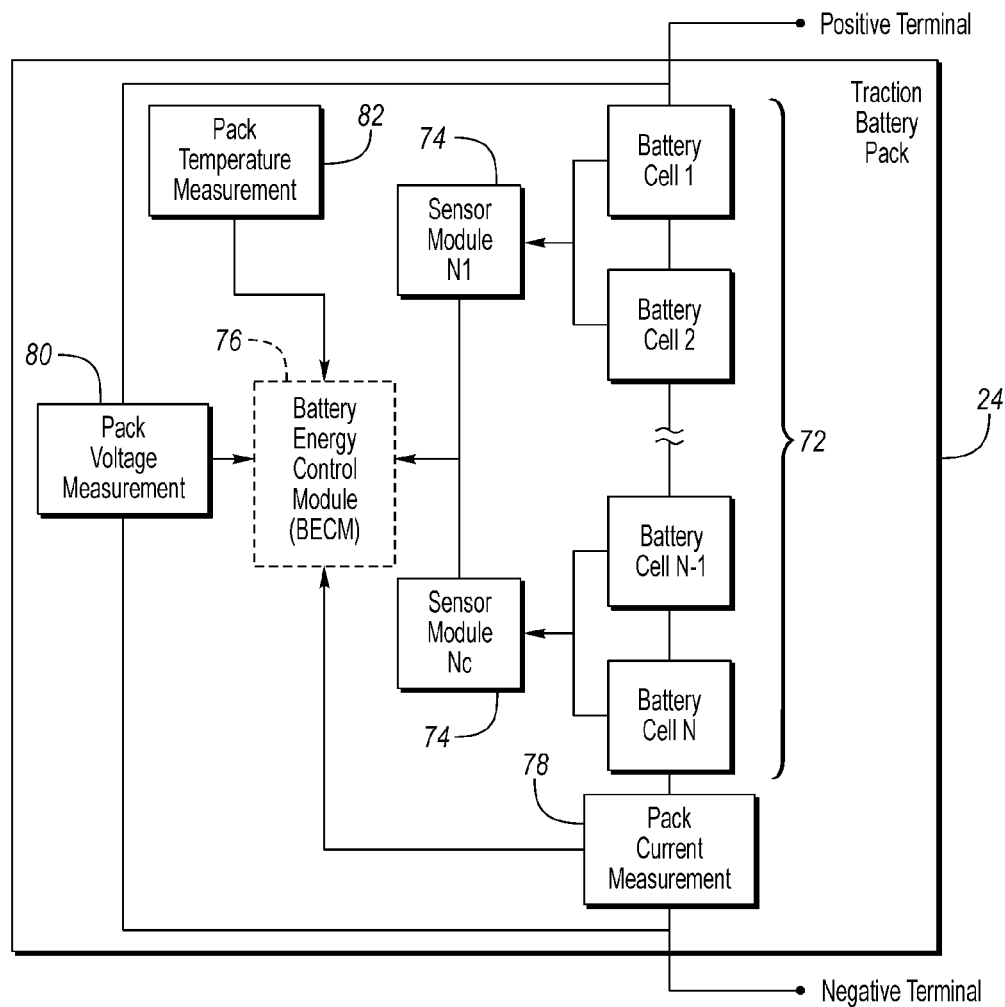
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A typical system may have a one or more controllers, such as a Battery Energy Control Module (BECM) 76 that monitors and controls the performance of the traction battery 24. The BECM 76 may monitor several battery pack level characteristics such as pack current 78, pack voltage 80 and pack temperature 82. The BECM 76 may have non-volatile memory such that data may be retained when the BECM 76 is in an off condition. Retained data may be available upon the next ignition cycle. A battery management system may be comprised of the components other than the battery cells and may include the BECM 76, measurement sensors (78, 80, 82), and sensor modules 74. The function of the battery management system may be to operate the traction battery in a safe and efficient manner.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to N, sensor modules 74 to measure the characteristics of each of the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module 74 hardware may be integrated as part of the circuitry in the BECM 76 and the BECM 76 may handle the processing of raw signals.

The battery cell 72 and pack voltages 80 may be measured using a voltage sensor. The voltage sensor circuit within the sensor module 74 and pack voltage measurement circuitry 80 may contain various electrical components to scale and sample the voltage signal. The measurement signals may be routed to inputs of an analog-to-digital (A/D) converter within the sensor module 74 and BECM 76 for conversion to a digital value. These components may become shorted or opened causing the voltage to be measured improperly. Additionally, these problems may occur intermittently over time and appear in the measured voltage data. The sensor module 74, pack voltage sensor 80 and BECM 76 may contain circuitry to ascertain the status of the voltage measurement components. In addition, a controller within the sensor module 74 or the BECM 76 may perform signal boundary checks based on expected signal operating levels.

Within a battery comprised of many connected cells, the state of charge of the cells may become unbalanced for many reasons including manufacturing variations, cell fading at different rates due to temperature distribution within the traction battery, and internal leakage at different rates due to chip design. Battery cell imbalance may be defined as a difference between the SOC of the cells. A battery controller 76 may include a cell balancing function. Cell balancing is a process that attempts to equalize the SOC of the cells by adding or subtracting charge from the affected cells.

Various methods of performing cell balancing are possible. A switch may be included across each battery cell that can selectively switch a circuit element across the cell. The circuit element may allow the cell to discharge. Alternatively, a switch may selectively connect cells together such that one cell discharges while charging another cell. Cell balancing may be achieved by selectively charging and discharging the cells of the battery until all of the cells have approximately the same state of charge. The battery controller 76 may include switches and interface circuitry to control and activate the switches. The battery controller 76 may implement software to perform cell balancing. The effectiveness of the cell balancing may be improved by using an accurate SOC estimate for each cell.

Figure 3:
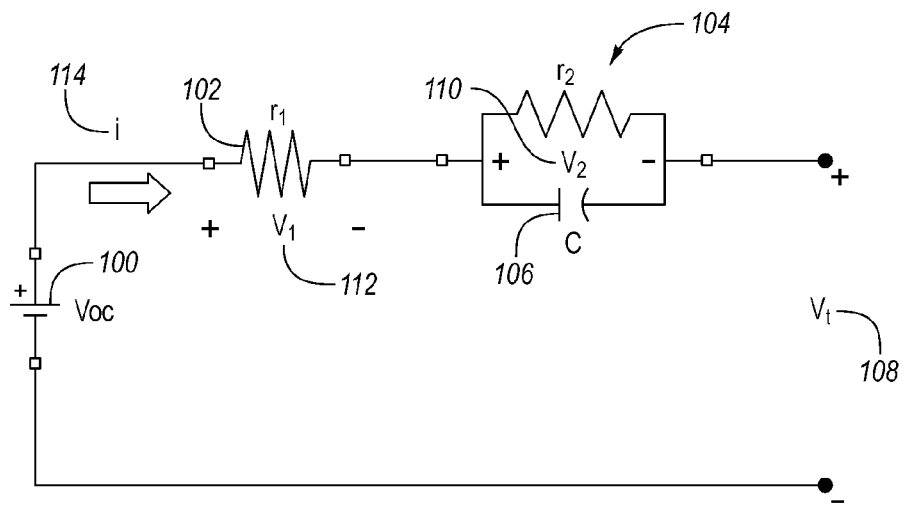
FIG. 3 is a diagram of an example battery cell equivalent circuit.

A battery cell may be modeled in a variety of ways. For example, a battery cell may be modeled as a circuit. FIG. 3 shows one possible battery cell equivalent circuit model (ECM). A battery cell may be modeled as a voltage source ($V_{oc}$) 100 having an associated impedance. The impedance may be comprised of one or more resistances (102 and 104) and a capacitance 106. $V_{oc}$ 100 represents the open-circuit voltage (OCV) of the battery. The model may include an internal resistance, $r_1$ 102, a charge transfer resistance, $r_2$ 104, and a double layer capacitance, C 106. The voltage $V_1$ 112 is the voltage drop across the internal resistance 102 due to current 114 flowing through the circuit. The voltage $V_2$ 110 is the voltage drop across the parallel combination of $r_2$ and C due to current 114 flowing through the combination. The voltage $V_t$ 108 is the voltage across the terminals of the battery (terminal voltage).

Figure 4:
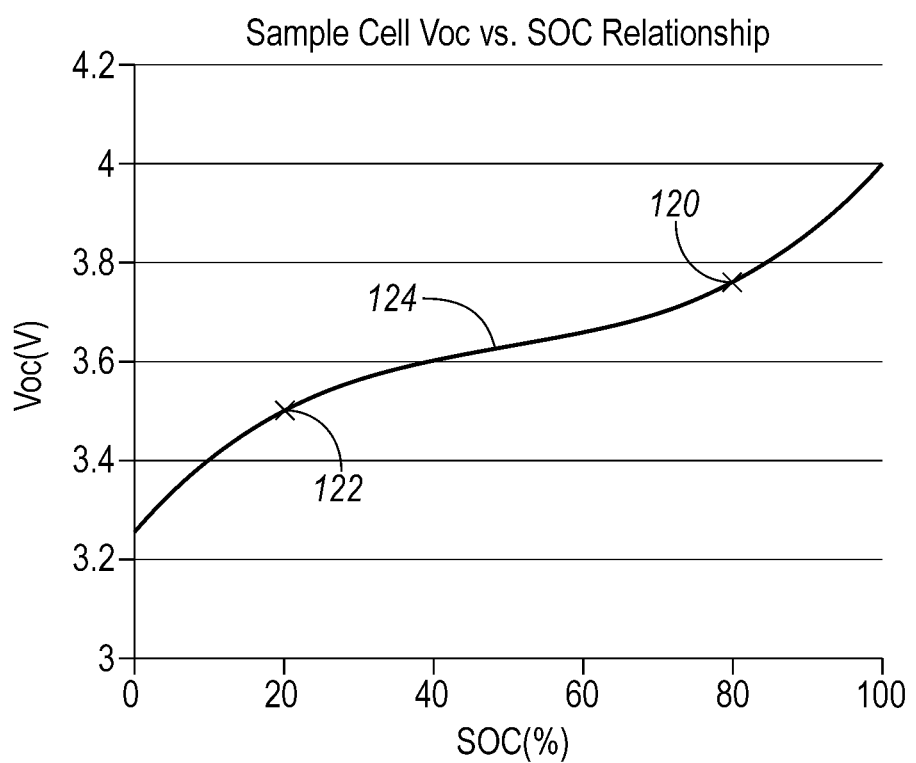
FIG. 4 is a graph that illustrates a possible open-circuit voltage (Voc) vs. battery state of charge (SOC) relationship for a typical battery cell.

Because of the battery cell impedance, the terminal voltage, $V_t$ 108, may not be the same as the open-circuit voltage, $V_{oc}$ 100. The open-circuit voltage, $V_{oc}$ 100, may not be readily measurable as only the terminal voltage 108 of the battery cell is accessible for measurement. When no current 114 is flowing for a sufficiently long period of time, the terminal voltage 108 may be the same as the open-circuit voltage 100. A sufficiently long period of time may allow the internal dynamics of the battery to reach a steady state. When current 114 is flowing, $V_{oc}$ 100 may not be readily measurable and the value may be inferred based on the SOC as shown in FIG. 4. The parameter values, $r_1$, $r_2$, and C may be known or unknown. The value of the parameters may depend on the cell design and the battery chemistry.

For a typical Lithium-Ion battery cell, there is a relationship between SOC and the open-circuit voltage ($V_{oc}$) such that $V_{oc}$=f(SOC). FIG. 4 shows a typical curve 124 showing the open-circuit voltage $V_{oc}$ as a function of SOC. The relationship between SOC and $V_{oc}$ may be determined from an analysis of battery properties or from testing the battery cells. The exact shape of the curve 124 may vary based on the exact formulation of the Lithium-Ion battery. The voltage $V_{oc}$ changes as a result of charging and discharging of the battery.

One possible model may be the equivalent circuit model of FIG. 3. The governing equations for the equivalent model may be written as:

$$\dot{V}_2 = -\frac{1}{r_2 C} V_2 + \frac{1}{C} * i \quad (1)$$

$$V_{oc} = V_t + V_2 + r_1 * i \quad (2)$$

where i is the current, and $\dot{V}_2$ is the time based derivative of $V_2$. The model may represent an individual cell or the entire traction battery (e.g., series connection of multiple cells). The various impedance values ($r_1$, $r_2$, and C) of the model may be estimated or predetermined values. Various impedance parameter estimation schemes may be utilized.

Referring to the model of FIG. 3, various voltage and current values may be measured on a per-cell basis or on an overall pack basis. For example, the terminal voltage, $V_t$ 108, may be measured for each cell of the traction battery. The current, i 114, may be measured for the entire traction battery since the same current may flow through each cell. Different pack configurations may use different combinations of measurements.

From the model, a relationship or function relating the terminal voltage to the open-circuit voltage may be determined. The terminal voltage may be expressed as $V_t$=g ($V_{oc}$, i). An inverse function may be determined that relates the open-circuit voltage 100 to the terminal voltage 108. This open-circuit voltage 100 may be described as $V_{oc}$=$g^{-1}$ ($V_t$, i). The above function and inverse function are dependent upon the model equations that are chosen. The example of FIG. 3 is one possible model and the methods described are not limited to this particular model.

The battery state of charge value may be used for estimating the usable battery energy and battery power capability. As the precision of the SOC value increases, the precision of battery control operations may increase. A precise SOC value may improve cell balancing which may increase the usable battery energy and reduce potential risks of excessive battery operation.

One prior art method of calculating SOC is current integration, also known as ampere-hour integration or Coulomb counting. This approach requires highly accurate current sensors to ensure a desired SOC estimation accuracy. Any measurement noise may result in inaccurate SOC estimations. More sophisticated methods with increased accuracy may also be used. Other approaches may use voltage information for estimating the SOC. Such approaches may rely on complex battery models and identification schemes. Some SOC estimation schemes may rely on executing a sophisticated identification model for each cell of the battery pack. Execution of these time-intensive algorithms for each battery cell may be beyond the capability of the battery management system due to limited computation power and hardware resources.

A traction battery may be comprised of battery cells having the same or sufficiently similar characteristics. The battery dynamics for each cell may be similar to the other cells of the battery pack. As the cells may be similar, the computational processes that are executed for each cell may result in the same or similar values. Performing the same computational processes may be redundant and unnecessary when the input values have similar values. A more efficient computational technique may be to estimate a cell SOC from an estimated reference SOC equivalent to an average battery cell SOC and an SOC difference between each cell and the reference SOC.

An advantage of this method may be a reduction in computational complexity. The estimate of the reference SOC may utilize sophisticated and computationally intensive techniques while the estimate of each cell SOC may utilize simple and rapidly executed instructions. This reduces complexity as the computationally intensive technique is only executed to calculate the reference SOC and is not repeated for each cell. Each cell SOC may be adjusted relative to the reference SOC using less computationally intensive techniques.

Figure 5:
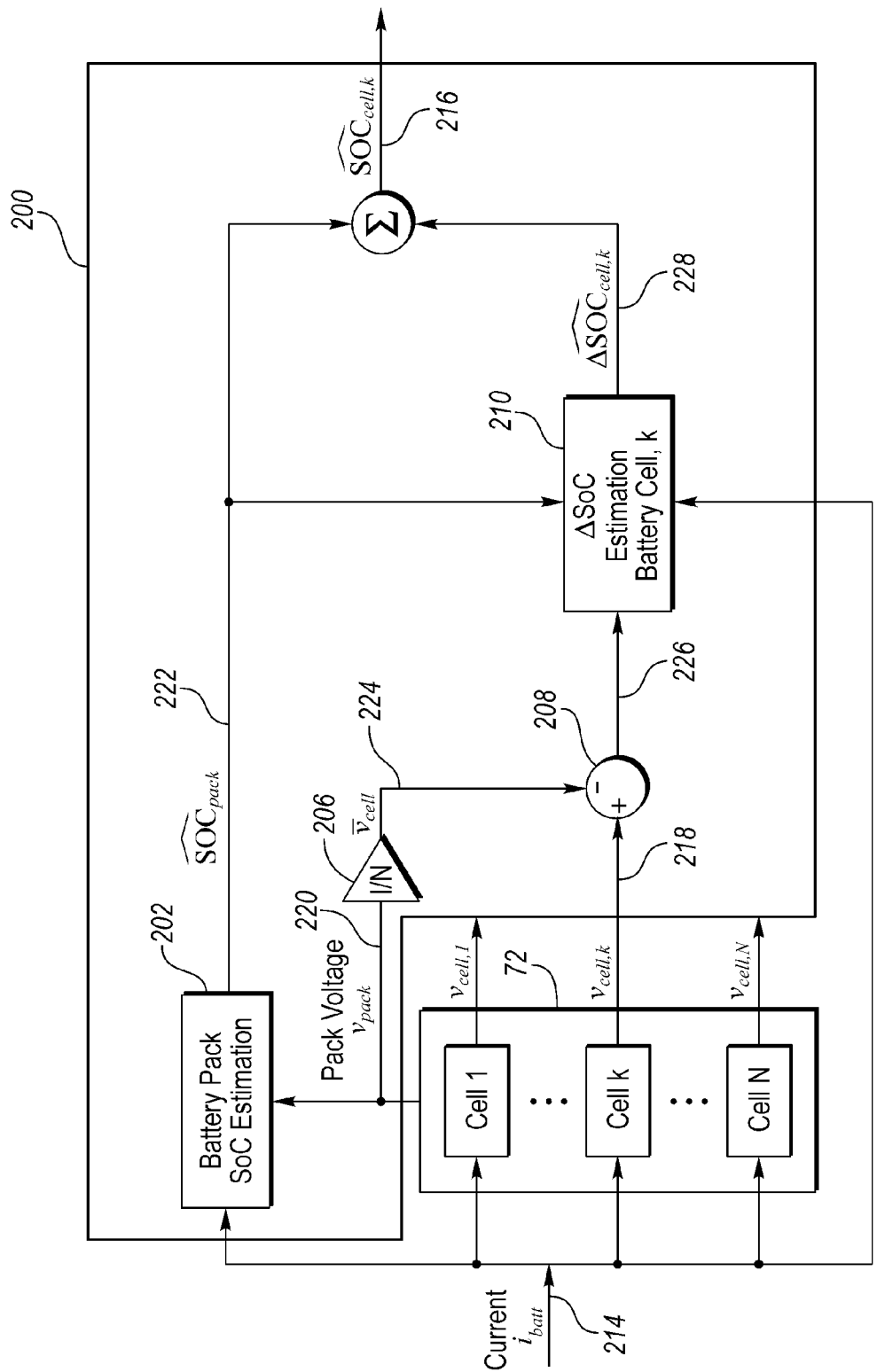
FIG. 5 is a block diagram that illustrates a possible battery management system for calculating cell states of charge.

FIG. 5 depicts a block diagram of a state of charge estimation function 200 of a battery management system for calculating the state of charge for each of the cells 72 of the traction battery. The state of charge estimation logic 200 may be executed as a function in a battery controller. The state of charge estimation logic 200 may include a battery pack SOC estimation function 202. The pack SOC estimation function 202 may utilize known techniques for accurately calculating a pack level SOC. To estimate the pack SOC, the pack SOC estimation function may use various measured values. The pack SOC estimation function 202 may use a battery current measurement 214 and a pack voltage measurement 220 to calculate and output a pack SOC 222. To achieve high accuracy, sophisticated modeling and identification schemes may be used to estimate the pack SOC.

The pack SOC 222 may be considered to be a combination of the SOC values of each of the cells. The pack SOC 222 may be considered to be an average cell SOC value. When the cells are precisely balanced, the states of charge of the cells and the overall pack state of charge may be the same value. In practice, however, there are variations in the cell states of charge that may be caused by cell variations and operating conditions.

The battery controller may measure a pack voltage 220. The pack voltage 220 may be the voltage across the terminals of the battery pack. The pack voltage 220 may be the sum of the battery cell voltages 72, assuming the battery cells 72 are connected in series. Not shown in FIG. 5 is hardware circuitry that may be present to scale and filter the pack voltage 220 measurement. In addition to measuring the pack voltage 220, the battery controller may measure the voltage across each cell 72 of the battery pack. FIG. 5 depicts a battery including N battery cells 72. Each cell voltage may be measured and input to the state of charge subsystem 200. For example, the voltage measurement of the kth cell 218 may be measured and input. The estimation scheme may be repeated for each cell of the battery pack.

An average cell voltage 224 may be the quotient of the pack voltage 220 divided by the number of battery cells, N. This is depicted by applying a gain 206 of 1/N to the pack voltage 220. A voltage difference 226 between the average cell voltage 224 and the kth cell voltage 218 may be calculated. This operation is represented by the difference element 208 of FIG. 5. The average cell voltage 224 calculation may be adjusted based on the particular configuration in the case in which the cells are not serially connected.

The controller may execute a ΔSOC estimation procedure 210 for calculating a state of charge deviation from the average SOC 222 for each cell. A cell state of charge difference 228 may be calculated for each cell relative to the average state of charge for all of the cells. The cell state of charge difference 228 may be added to the overall pack SOC 222 to yield a cell SOC 216 for the cell. The operation may be described by the equation:

$$SOC_{cell,k} = SOC_{pack} + \Delta SOC_{cell,k} \quad (3)$$

This operation is represented by a second summing junction 212 in FIG. 5. This procedure may be repeated for each cell of the traction battery. Each battery cell may have an associated state of charge difference.

Figure 6:
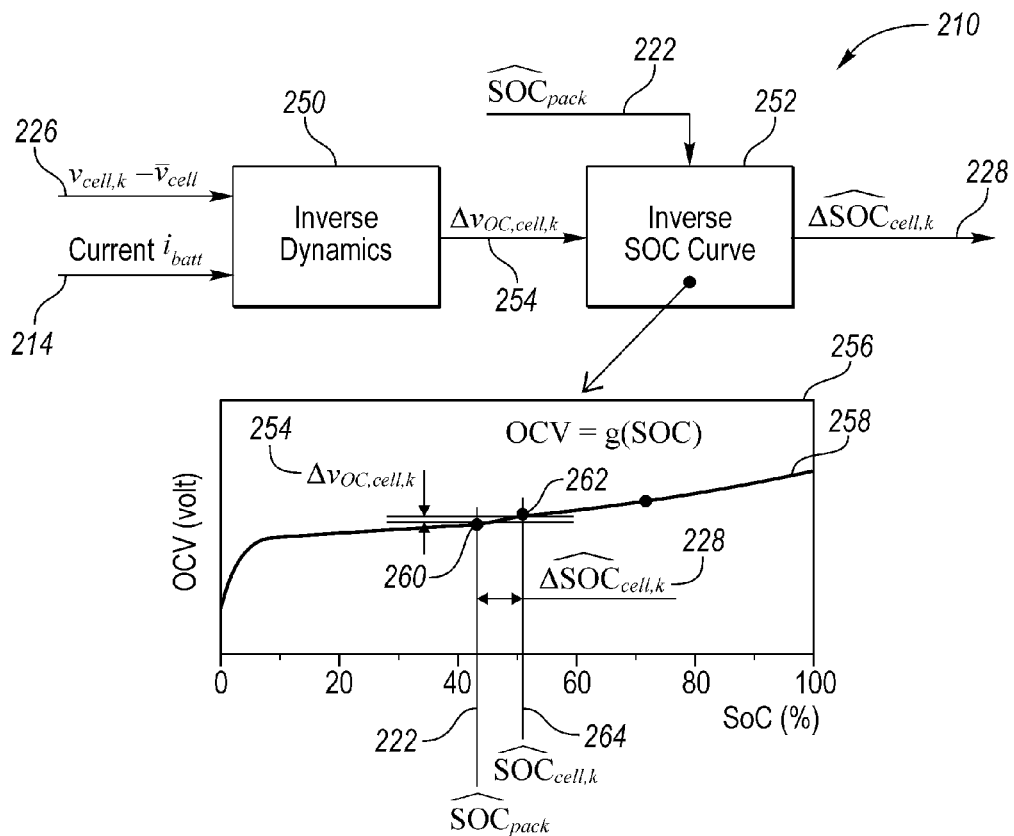
FIG. 6 is a block diagram that illustrates a possible battery cell estimation scheme for calculating a state of charge adjustment for a battery cell.

The ΔSOC estimation procedure 210 may include additional logic as shown in FIG. 6. The voltage difference 226 between the cell voltage and the average cell voltage may be used to calculate a cell open-circuit voltage difference 254 between a cell open-circuit voltage and an average open-circuit voltage of the cells. A relationship between a terminal voltage difference and the open-circuit voltage difference may be known based on the chosen model. To generate the cell open-circuit voltage difference 254, an inverse dynamic model 250 may be utilized. The model 250 may also utilize the battery current 214. The model may be as shown in FIG. 3 and represented by Equations (1) and (2). The model may be executed in the controller and the output may be the cell open-circuit voltage difference 254. Note that other models may be used with similar results.

The open-circuit voltage difference 254 may be input to an inverse SOC curve or function 252. The inverse SOC function 252 may utilize the battery characteristic curve or function 256. The characteristic is similar to the curve described in FIG. 4. An additional input to the inverse SOC function 252 may be the estimated pack SOC 222. The operation of the inverse SOC function 252 may be understood with reference to the characteristic curve 256.

A starting point 260 on the curve 258 associated with the pack SOC 222 may be determined. The starting point 260 may define a reference voltage of the cell that is associated with the pack or average cell SOC 222. The reference voltage value at the starting point 260 may be the average open-circuit voltage for cells. The open-circuit voltage difference 254 may be used as a voltage offset to determine a cell open-circuit voltage. Using the open-circuit voltage difference 254, a cell open-circuit voltage may be determined. The cell open-circuit voltage may be defined as a sum of the average open-circuit voltage and the open-circuit voltage difference 254. The resulting open-circuit cell voltage may define a point 262 on the curve 258 with an associated cell state of charge 264. The change in SOC 228 may be defined as the difference between the cell state of charge 264 and the average SOC 222.

Figure 7:
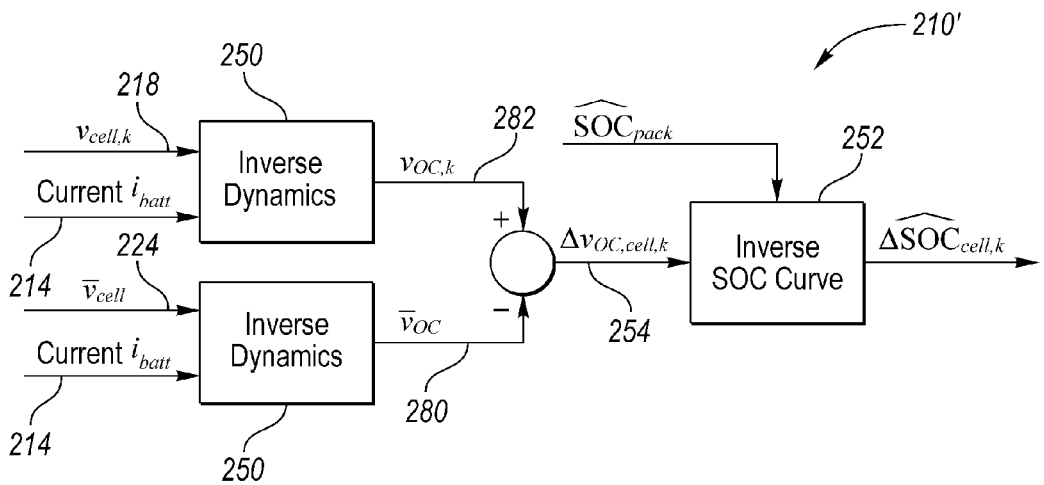
FIG. 7 is a block diagram that illustrates another possible battery cell estimation scheme for calculating a state of charge adjustment for a battery cell.

An alternate ΔSOC estimation scheme 210' is depicted in FIG. 7. In this example the open-circuit voltage difference is not input directly. In the alternate example, the cell voltage 218 and the average cell voltage 224 are separately input to the inverse dynamics block 250. The outputs are an open-circuit voltage 282 for the cell and an average open-circuit voltage 280 for all of the cells. The open-circuit voltage difference 254 may then be the difference between the cell open-circuit voltage 282 and the average open-circuit voltage 280. The open-circuit voltage difference 254 may then be input to the inverse SOC function 252 as described previously.

The above method may be implemented in a battery controller as part of a battery management system. The cell state of charge values may be utilized for balancing the cells or operating the traction battery. An advantage of this method is that it may be less computationally intensive than other methods. A highly accurate pack SOC estimation scheme may be implemented. Each cell SOC is then calculated using less computationally intensive models. Accuracy for the cell SOC values is retained as the method relies on the highly accurate pack SOC estimate to determine the cell SOC values.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery including a plurality of cells; and
at least one controller programmed to, in response to a difference between a cell voltage and an average cell voltage, output a cell state of charge based on a voltage offset derived from the difference and relative to a reference voltage associated with a traction battery state of charge, and balance the cells according to the cell state of charge of the cells.

2. The vehicle of claim 1 wherein the at least one controller is further programmed to, in response to no difference between the cell voltage and the average cell voltage, output the cell state of charge based on the reference voltage associated with the traction battery state of charge.

3. The vehicle of claim 1 wherein the average cell voltage is a quotient of an overall voltage of the traction battery and a total number of cells of the traction battery.

4. The vehicle of claim 1 wherein the voltage offset is further derived from a battery current.

5. The vehicle of claim 1 wherein the cell state of charge is further based on a cell open-circuit voltage difference estimated from a cell model, wherein the difference and a battery current are inputs to the cell model.

6. The vehicle of claim 5 wherein the cell state of charge is further based on an open-circuit voltage and state of charge characteristic such that the cell state of charge is the traction battery state of charge offset by a state of charge difference associated with the cell open-circuit voltage difference.

7. A battery management system comprising:
at least one controller programmed to, operate a traction battery including a plurality of cells according to a cell state of charge of the cells that is based on a voltage difference between an open-circuit cell voltage and an average open-circuit cell voltage and relative to a cell voltage associated with a traction battery state of charge.

8. The battery management system of claim 7 wherein the average open-circuit cell voltage is based on an overall voltage of the traction battery and a total number of cells of the traction battery.

9. The battery management system of claim 7 wherein the open-circuit cell voltage is based on a measured cell terminal voltage.

10. The battery management system of claim 7 wherein the voltage difference is based on a battery current.

11. The battery management system of claim 7 wherein operating the traction battery includes balancing the cells based on the cell state of charge of the cells.

12. The battery management system of claim 7 wherein the voltage difference is based on a cell model output having a difference between a measured cell terminal voltage and an average cell terminal voltage as input.

13. The battery management system of claim 7 wherein the voltage difference is based on a first cell model output having a measured cell voltage as input and a second cell model output having an average cell terminal voltage as input.

14. A battery control method comprising:
operating, by a controller, a traction battery including a plurality of cells according to a cell state of charge of the cells based on a voltage offset derived from a difference between a measured cell voltage and an average cell voltage and relative to a cell reference voltage associated with a state of charge of the traction battery.

15. The method of claim 14 wherein the voltage offset is further derived from a battery current.

16. The method of claim 14 further comprising balancing the cells of the traction battery according to the cell state of charge of the cells.

17. The method of claim 14 wherein the average cell voltage is based on an overall voltage of the traction battery.

18. The method of claim 14 wherein the cell state of charge is further based on an open-circuit voltage and state of charge characteristic such that the cell state of charge is an average state of charge of the traction battery offset by an amount of state of charge associated with an open-circuit cell voltage difference.

* * * * *